US010611366B2

(12) United States Patent
Jundt et al.

(10) Patent No.: US 10,611,366 B2
(45) Date of Patent: Apr. 7, 2020

(54) METHOD FOR PREDICTIVE ROLLOVER PREVENTION OF A VEHICLE

(71) Applicant: KNORR-BREMSE SYSTEME FUER NUTZFAHRZEUGE GMBH, Munich (DE)

(72) Inventors: Oliver Jundt, Hessigheim (DE); Daniel Thum, Stuttgart (DE); Jonas Leibbrand, Niefern-Oeschelbronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 8 days.

(21) Appl. No.: 15/767,565

(22) PCT Filed: Oct. 10, 2016

(86) PCT No.: PCT/EP2016/074161
§ 371 (c)(1),
(2) Date: Apr. 11, 2018

(87) PCT Pub. No.: WO2017/063984
PCT Pub. Date: Apr. 20, 2017

(65) Prior Publication Data
US 2018/0304884 A1 Oct. 25, 2018

(30) Foreign Application Priority Data
Oct. 13, 2015 (DE) .................. 10 2015 013 143

(51) Int. Cl.
*B60W 30/04* (2006.01)
*B60T 8/17* (2006.01)
(Continued)

(52) U.S. Cl.
CPC .......... *B60W 30/04* (2013.01); *B60T 8/1708* (2013.01); *B60T 8/17554* (2013.01);
(Continued)

(58) Field of Classification Search
None
See application file for complete search history.

(56) References Cited

U.S. PATENT DOCUMENTS 5,752,214 A * 5/1998 Minowa ............ B60K 31/0008
701/111
5,888,074 A * 3/1999 Staplin .................. G09B 9/052
340/576
(Continued)

FOREIGN PATENT DOCUMENTS

DE 19543551 A1 5/1996
DE 102009000397 A1 7/2010
(Continued)

OTHER PUBLICATIONS

International Search Report dated Dec. 15, 2016 of the corresponding International Application PCT/EP2016/074161 filed Oct. 10, 2016.

*Primary Examiner* — Yuen Wong
*Assistant Examiner* — Hongye Liang
(74) *Attorney, Agent, or Firm* — Norton Rose Fulbright US LLP; Gerard Messina

(57) ABSTRACT

A method for preventing a rollover of a vehicle or a tractor-trailer combination in curves, by counteracting a rollover risk of the vehicle by independent regulating interventions, performed without action by a vehicle driver, in a regulation system that actuates the drive and/or the brakes of the vehicle, the method including: capturing the current driving situation and the current load of the vehicle or the tractor-trailer combination as to the current driving position of the vehicle or the tractor-trailer combination, ascertaining a maximum admissible transverse acceleration at the current driving position, at which maximum admissible transverse acceleration the vehicle or the tractor-trailer combination just does not roll over, as to the current driving situation and
(Continued)

the current load of the vehicle or the tractor-trailer combination. Also described is a related apparatus for preventing a rollover of a vehicle or a tractor-trailer combination in curves.

14 Claims, 2 Drawing Sheets

(51) Int. Cl.
  *B60T 8/1755* (2006.01)
  *B60W 10/18* (2012.01)
  *B60W 30/09* (2012.01)
  *B60W 30/095* (2012.01)
  *B60W 50/14* (2020.01)

(52) U.S. Cl.
  CPC ............ *B60W 10/18* (2013.01); *B60W 30/09* (2013.01); *B60W 30/0956* (2013.01); *B60W 50/14* (2013.01); *B60T 2201/16* (2013.01); *B60T 2210/12* (2013.01); *B60T 2210/20* (2013.01); *B60T 2210/30* (2013.01); *B60T 2210/36* (2013.01); *B60W 2030/043* (2013.01); *B60W 2050/143* (2013.01); *B60W 2050/146* (2013.01); *B60W 2550/142* (2013.01); *B60W 2550/148* (2013.01); *B60W 2710/182* (2013.01); *B60W 2710/223* (2013.01); *B60W 2720/10* (2013.01)

(56) References Cited

U.S. PATENT DOCUMENTS

| | | | |
|---|---|---|---|
| 8,554,468 B1 | 10/2013 | Bullock | |
| 2006/0129298 A1* | 6/2006 | Takeda | B60T 8/17554 701/70 |
| 2006/0199698 A1* | 9/2006 | Eriksson | B60T 8/00 477/92 |
| 2009/0005945 A1* | 1/2009 | Takeda | B60T 7/22 701/70 |
| 2011/0125376 A1* | 5/2011 | Chappell | B60W 10/06 701/65 |
| 2013/0131947 A1 | 5/2013 | Takahashi et al. | |
| 2017/0129487 A1* | 5/2017 | Wulf | B60T 7/22 |
| 2018/0274645 A1* | 9/2018 | Mair | F16H 48/24 |

FOREIGN PATENT DOCUMENTS

| | | |
|---|---|---|
| DE | 102011017588 A1 | 10/2012 |
| WO | 2004/110809 A1 | 12/2004 |
| WO | 2009/083749 A1 | 7/2009 |

* cited by examiner

METHOD FOR PREDICTIVE ROLLOVER PREVENTION OF A VEHICLE

FIELD OF THE INVENTION

The present invention relates to a method for preventing a rollover of a vehicle or a tractor-trailer combination in curves, the method counteracting a rollover risk of the vehicle by way of independent regulating interventions, carried out without action by a vehicle driver, in a regulation system that actuates the drive and/or the brakes of the vehicle and the method including at least the following steps: capturing the current driving situation and the current load of the vehicle or the tractor-trailer combination in relation to the current driving position of the vehicle or the tractor-trailer combination, ascertaining a maximum admissible transverse acceleration at the current driving position, at which maximum admissible transverse acceleration the vehicle or the tractor-trailer combination just does not roll over, in relation to the current driving situation and the current load of the vehicle or the tractor-trailer combination. The present invention also relates to an apparatus for preventing a rollover of a vehicle or a tractor-trailer combination in curves, the apparatus containing at least one regulation system that actuates the drive and/or the brakes of the vehicle, the regulation system counteracting a rollover risk of the vehicle by way of independent regulating interventions, carried out without action by a vehicle driver, the apparatus being controlled by the method.

BACKGROUND INFORMATION

As a rule, modern vehicles, in particular modern commercial vehicles, are equipped with an electronic stability program (ESP) that attempts to prevent unstable driving situations such as skidding. Since commercial vehicles, in particular, often have a high center of mass on account of their load situation, the ESP of commercial vehicles has a roll stability program (RSP) or a roll stability control (RSC) as a partial function, the partial function attempting to prevent the vehicle from rolling over, particularly during cornering. In the case of such a roll stability program (RSP), current driving situation data such as measured speed, measured steering wheel angle, and measured transverse acceleration, and also the load are taken into account. If the vehicle reaches a rollover-critical transverse acceleration that was ascertained on the basis of the driving situation data and the load, the speed and/or the steering angle of the vehicle is corrected within the scope of the RSP partial function of the ESP by way of motor and/or brake interventions and/or steering interventions, without action by the driver, until the risk of rollover has abated. However, since the ESP or the RSP partial function thereof can only intervene on account of the current driving situation but, in the process, the further course of the route is not taken into account, the ESP or the RSP partial function thereof can only intervene at a very short time prior to rollover. However, this strategy may lead to it not being possible to correct the speed or the transverse acceleration or the steering angle of the vehicle quickly enough to effectively prevent a rollover of the vehicle, especially if the contact force of the wheels on the inner side of the curve has significantly reduced on account of the transverse acceleration and consequently it is possible to transfer only little lateral guidance or brake force onto the roadway.

SUMMARY OF THE INVENTION

In relation thereto, the invention is based on the object of developing a method and an apparatus of the type set forth at the outset in such a way that a rollover of the vehicle is prevented with higher reliability.

According to the invention, this object is achieved by the features described herein.

The method according to the invention is characterized by at least the following steps:

obtaining information items about the course of a route $(x_1, x_n)$ ahead, proceeding from the current driving position $(x_{act})$ of the vehicle or the tractor-trailer combination, comprising information items about the curvature profile $\{\kappa(x)\}$ of the route $(x_1, x_n)$ ahead, calculating maximum limit speeds $\{v_{max}(x)\}$ that ensure a rollover-safe passage along the route $(x_1, x_n)$ ahead, in relation to the respective driving position $(x)$ along the route $(x_1, x_n)$ ahead, on the basis of the curvature profile $\{\kappa(x)\}$ of the route $(x_1, x_n)$ ahead and on the basis of the maximum admissible transverse acceleration $(a_{y\ max\ ROP})$ according to the following calculation rule:

$$v_{max}(x) = \sqrt{\frac{a_{y\ max\ ROP}}{\kappa(x)}}$$

calculating longitudinal decelerations $\{a_{x\ need}(x)\}$ that are required to prevent rollover, in relation to the respective driving position $(x)$ along the route $(x_1, x_n)$ ahead, on the basis of the maximum limit speeds $\{v_{max}(x)\}$ and on the basis of the vehicle speed $(v_{act})$ present at the current driving position $(x_{act})$ of the vehicle or the tractor-trailer combination according to the following calculation rule:

$$a_{x\ need}(x) = \frac{v(x)^2_{max} - v^2_{act}}{2 \cdot x}$$

determining a maximum required deceleration $(a_{x\ max\ needed})$ from the longitudinal decelerations $\{a_{x\ need}(x)\}$ that are required to prevent rollover, which are related to the respective driving position $(x)$ along the route $(x_1, x_n)$ ahead:

$a_{x\ max\ need} = \max(a_{x\ need}(x))$ regulating, on the basis of the maximum required deceleration $(a_{x\ max\ needed})$, the actual speed of the vehicle or the tractor-trailer combination, depending on the driving position $(x)$ along the route $(x_1, x_n)$, to the maximum limit speed $\{v_{max}(x)\}$ that was calculated for the relevant driving position $(x)$ in such a way that there only is a regulation of the actual speed for the driving positions $(x)$ along the route $(x_1, x_n)$ at which there is a need for a longitudinal deceleration but no longitudinal acceleration.

Expressed differently, evaluating information items about the course of the route ahead reduces the vehicle speed in good time at driving positions where this is necessary, i.e. already before the relevant driving positions are reached. In a manner redundant thereto, the driving dynamics stability system still is present in order to prevent a rollover of the vehicle if the vehicle driver does not brake in good time.

To this end, the profile of the curve radii r and/or the curvatures (1/r) of the route is ascertained with the aid of an analysis of geometric characteristics of the course of the route ahead. With inclusion of the current driving situation and the current load of the vehicle or the tractor-trailer combination, limit speeds for the route ahead are ascertained, the limit speeds allowing the route ahead to be passed without the vehicle or the tractor-trailer combination rolling over. Then, if it is determined that the ascertained limit speeds are exceeded at certain driving positions along the route, the vehicle is immediately decelerated to the limit speeds ascertained at the location in each case.

Therefore, what is advantageous here is that a rollover risk is already identified in advance and interventions are carried out in good time. A tightening of a curve, i.e. a radius that reduces along the route, and fast and excessive steering actuations by the vehicle driver can be taken into account in good time by the method for preventing a rollover according to the invention. It may also be possible to prevent braking interventions if an engine brake is sufficient. Consequently, there is increased convenience in the case of interventions for preventing rollover. Therefore, overall, there is increased safety against rolling over.

Advantageous developments and improvements of the invention specified in claim 1 are possible as a result of the measures listed in the dependent claims.

Particularly, a necessary brake force ($F_{brems}$) that is required to obtain the maximum required deceleration ($a_{x\ max\ needed}$) may be calculated on the basis of the mass ($m_{Fzg}$) of the vehicle or the tractor-trailer combination according to the following calculation rule:

$$F_{brems} = m_{Fzg} * a_{x\ max\ need}$$

If the necessary brake force ($F_{brems}$) cannot be applied, or cannot be applied completely, by an active actuation of a brake of the vehicle or the tractor-trailer combination by the vehicle driver and/or by forces that can be traced back to conditions of the route ($x_1$, $x_n$) such as e.g. a grade, the required brake force ($F_{brems}$) or the component of the brake force that is still missing in relation to the required brake force ($F_{brems}$) may be produced by actuating, within the meaning of braking, at least one of the following vehicle devices without action by the vehicle driver: a continuous service brake device, a motor, a service brake device, a parking brake device.

By way of example, capturing the current driving situation of the vehicle or the tractor-trailer combination comprises at least the following: the ascertainment of the current speed ($v_{act}$) and/or the current acceleration ($a_{act}$) of the vehicle or the tractor-trailer combination in relation to the current driving position ($x_{act}$) of the vehicle or the tractor-trailer combination.

According to a development, obtaining information items about the course of the route ($x_1$, $x_n$) ahead, proceeding from the current driving position ($x_{act}$) of the vehicle or the tractor-trailer combination, furthermore contains obtaining information items about the grade, inclination and/or coefficient of friction of the route ($x_1$, $x_n$) ahead.

According to a further measure, obtaining information items about the course of the route ($x_1$, $x_n$) ahead, proceeding from the current driving position ($x_{act}$) of the vehicle or the tractor-trailer combination, is effectuated with the aid of onboard devices in relation to the vehicle or the tractor-trailer combination and/or with the aid of external data sources. By way of example, these information items or this data can be provided by the following systems: radar systems, camera systems, lidar systems, ultrasound systems, car-to-car communication systems, car-to-cloud-to-car communication systems, road-to-car communication systems, navigation systems (electronic map material).

Particularly, it is also possible to produce characteristics representing risk potentials at assigned driving positions (x) on the basis of the longitudinal decelerations $\{a_{x\ need}(x)\}$ in relation to the respective driving position (x) along the route ($x_1$, $x_n$) ahead.

Here, in particular, if a limit characteristic that represents a certain limit risk potential is already exceeded by a characteristic before reaching the driving position (x) assigned to this characteristic, at least one of the following measures can be performed: outputting an acoustic and/or optical warning signal for the vehicle driver, activating collision protection devices, stiffening the suspension of the vehicle or the tractor-trailer combination, increasing the brake pressure in brake cylinders.

In particular, active braking interventions by the vehicle driver can also be taken into account when determining the conditions of the route ($x_1$, $x_n$) such as e.g. uphill grades, downhill grades or inclinations. Likewise, conditions of the route ($x_1$, $x_n$) and/or active braking interventions by the vehicle driver can be taken into account when determining the required longitudinal decelerations $\{a_{x\ need}(x)\}$.

Particularly, devices that serve to decelerate the vehicle or the tractor-trailer combination, such as e.g. the service brake device, the parking brake device, a retarder, may also be tested in respect of their availability in order to ensure the use thereof for decelerating the vehicle or the tractor-trailer combination within the scope of the method according to the invention or in order to ensure a selection of usable devices.

Furthermore, actuations or activations by the vehicle driver of at least the following devices can be tested: retarder, brake pedal, driver assistance systems, accelerator pedal, differential lock. This may be carried out, in particular, for the purposes of the method taking into account a deceleration of the vehicle or the tractor-trailer combination already brought about thereby.

The invention also relates to an apparatus for preventing a rollover of a vehicle or a tractor-trailer combination in curves, the apparatus containing at least one regulation system that actuates the drive and/or the brakes of the vehicle, the regulation system counteracting a rollover risk of the vehicle by way of independent regulating interventions, carried out without action by a vehicle driver, controlled by the above-described method, and to a vehicle having such an apparatus.

Further measures that improve the invention will be presented in more detail below together with the description of an exemplary embodiment of the invention on the basis of the drawings.

DETAILED DESCRIPTION

Figure 1:
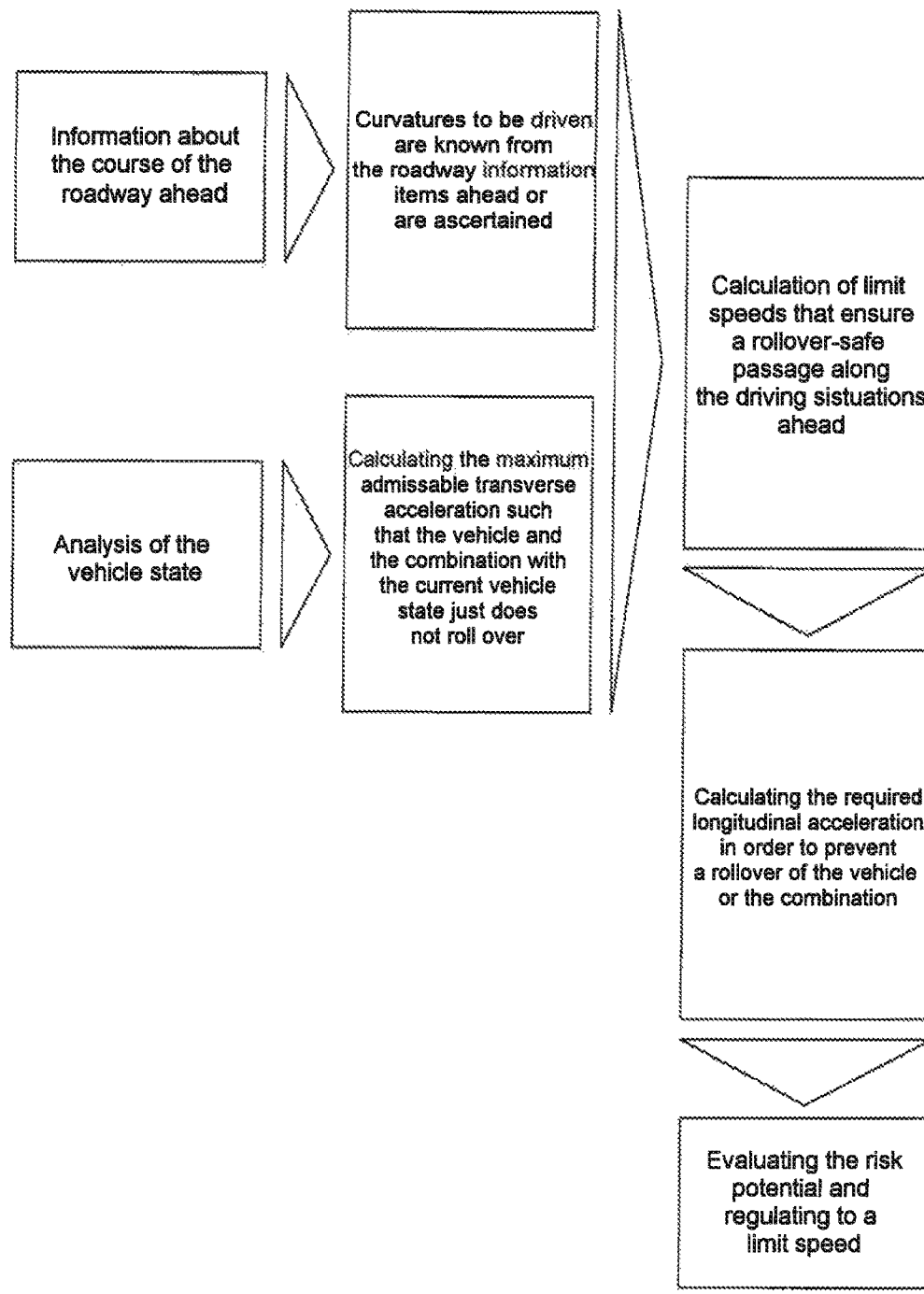
FIG. 1 shows a schematic illustration of the flow of a method according to the invention in accordance with an exemplary embodiment.

FIG. 1 schematically shows a flow of a method for preventing a rollover of a vehicle or a tractor-trailer combination in curves, the method counteracting a rollover risk of the vehicle by way of independent regulating interventions, carried out without action by a vehicle driver, in a regulation system that actuates the drive and/or the brakes of the vehicle.

The vehicle may be a heavy commercial vehicle, in particular a tractor of a tractor-trailer combination with an electropneumatic brake device. By way of example, in the present case, the tractor-trailer combination has a single axle or multi-axle semitrailer (not shown here); however, a drawbar trailer or a number of drawbar trailers or else a single axle or multi-axle center-axle trailer may also be hitched to the tractor. The explanations made below in relation to the method according to the invention apply both to the tractor on its own and to the entire tractor-trailer combination.

Here, a service brake device of the tractor or of the tractor-trailer combination is formed by, for example, an electropneumatic friction brake device in the form of an electronic brake system (EBS), in which the brake pressure is regulated.

In the case of such an electronic brake system (EPS), pressure regulating modules are present on each axle or each wheel, the pressure regulating modules having integrated inlet valves, outlet valves and backup valves and having pressure sensors for capturing the actual brake pressure and having a local electronic controller or brake pressure regulator for matching the actual brake pressures to the setpoint brake pressures according to the respective braking requirement. The construction and function of such pressure regulating modules are sufficiently well known and will therefore not be discussed in any more detail here.

The electronic brake system (EBS) of the tractor furthermore contains a brake-slip control (ABS), the ABS control routines of which may be integrated into a central electronic EBS brake controller. Furthermore, in the electronic brake system (EBS) here, there may be a traction control system (ASR), an electronic stability program (ESP) with a roll stability program (RSP) or a roll stability control (RSC) as a partial function, which attempts to prevent the tractor or the tractor-trailer combination from rolling over, particularly during cornering, wherein the control routines in this respect are likewise implemented in the central brake controller.

Within the scope of the roll stability program (RSP), the current driving situation and the current load of the tractor or the tractor-trailer combination may be captured in relation to a current driving position $x_{act}$ of the tractor or the tractor-trailer combination. By way of example, the current driving situation contains the current speed $v_{act}$ and/or the current acceleration acct of the tractor or the tractor-trailer combination in relation to the current driving position $x_{act}$. In FIG. 1, this step is symbolized by the "Analysis of the vehicle state" box. The "Analysis of the vehicle state" furthermore also contains, for example, the distribution of the load/mass to the front/back and an ascertainment of the position of the center of mass, in particular the center-of-mass height. Furthermore, this analysis may also contain testing the availability of devices and functions that can ensure a deceleration of the tractor or the tractor-trailer combination, such as the service brake device, the parking brake device and/or a retarder, for example. Furthermore, this analysis may also contain a test of activations and actuations of devices by the vehicle driver, such as e.g. a retarder activity, a brake pedal position, an activation of various comfort functions (ACC, cruise control), an accelerator pedal position, a differential lock.

Furthermore, a maximum admissible transverse acceleration $a_{y\ max\ ROP}$ at the current driving position $x_{act}$ may be ascertained within the scope of the roll stability program (RSP), at which maximum admissible transverse acceleration the vehicle or the tractor-trailer combination just does not roll over, to be precise in relation to the current driving situation and the current load of the tractor or the tractor-trailer combination. In FIG. 1, this step is characterized by the "Calculating the maximum admissible transverse acceleration" box.

In parallel therewith, or therebefore or thereafter in time, information items about the course of a route $x_1$ to $x_n$ ahead are captured, proceeding from a current driving position $x_{act}$ of the vehicle or the tractor-trailer combination, the information items, in particular, comprising information items about the curvature profile $\kappa(x)$ of the route $x_1$ to $x_n$ ahead. In FIG. 1, this step is symbolized by the "Information about the course of the roadway ahead" and the box adjoining this to the right.

Figure 2:
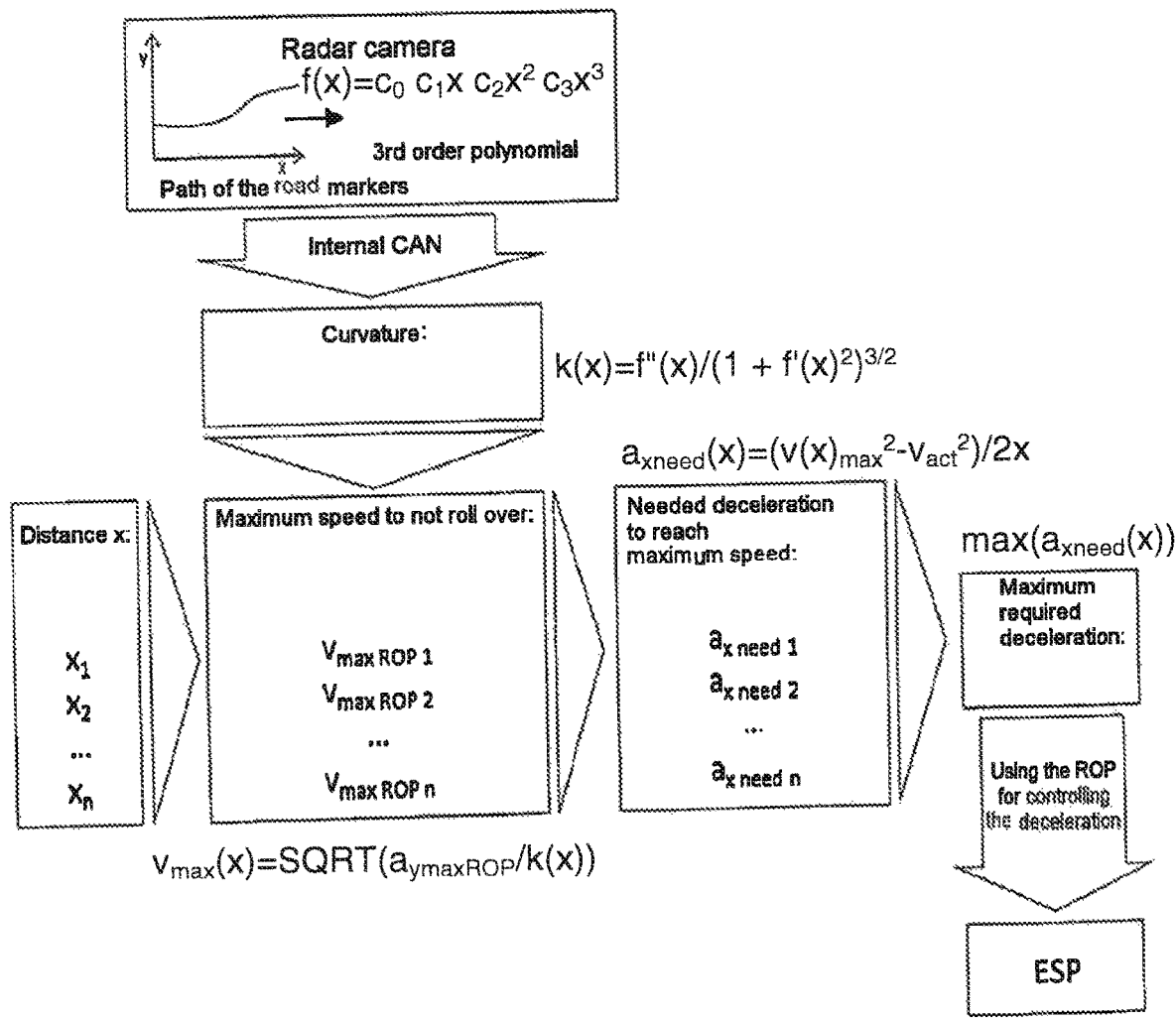
FIG. 2 shows a further schematic illustration of the flow of the method of FIG. 1.

The route ahead ("Path of the road markers") is characterized here by n nodes $x_i$ (i=1 to n, "road markers"), for example, as shown in FIG. 2, in particular. The character "x" or the characters "$x_1, x_2, x_3, \ldots x_n$" represents/represent the distance x of a driving position along the route $x_1$ to $x_n$ ahead from the current driving position $x_{act}$, as illustrated in the "Distance x" box in FIG. 2.

Here, the assumption is made that the route $x_1$ to $x_n$ ahead is in a plane. However, in addition, the vertical course of the route ahead can also be captured. By way of example, in this diagram, the current driving position $x_{act}$ of the tractor is at the start of the diagram at the time t=0, and so, proceeding from the current driving position $x_{act}$, the tractor assumes the nodes $x_1$ to $x_n$ or the distances $x_1$ to $x_n$ from the current driving position $x_{act}$ with increasing time t. Here, the last distance $x_n$ marks the last node, the data of which are known or are able to be obtained.

By way of example, the tractor has an onboard radar camera with a dedicated evaluation device, by which the route $x_1$ to $x_n$ ahead is captured. Here, the evaluation may be effectuated with the aid of a third order polynomial:

$$f(x)=C_0+C_1 \cdot x+C_2 x^2+C_3 x^3$$

On the basis of the data obtained about the route $x_1$ to $x_n$ ahead, the curvature profile thereof—"curvature" or $\kappa(x)$—is ascertained in relation to the distance from the current driving position $x_{act}$ or in relation to the driving position $x_i$. Consequently, the assigned curvature $\kappa(x_1), \kappa(x_2) \ldots \kappa(x_n)$ is calculated in this step for each distance $x_1$ to $x_n$ from the current driving position $x_{act}$ according to the following calculation rule:

$$\kappa(x) = \frac{f''(x)}{(1+f'(x)^2)^{\frac{3}{2}}}$$

The information items about the course of a route $x_1$ to $x_n$ ahead therefore contain the curvature profile $\kappa(x)$ of the roadway. Moreover, the following variables contribute to improve and clarify the course of the route $x_1$ to $x_n$ ahead: the grade, the (lateral) inclination and the coefficient of friction of the route or the roadway.

The information about the course of a route $x_1$ to $x_n$ ahead can be provided by the radar camera directly on board of the tractor, as may be in this case, and/or can be obtained from data transmitted from external devices. By way of example, these data can be provided or transmitted from the following systems: radar systems, camera systems, lidar systems, ultrasound systems, car-to-car communication systems, car-to-cloud-to-car communication systems, road-to-car communication systems, navigation systems (electronic map material).

This is followed by the step of calculating maximum limit speeds $v_{max}(x)$ that ensure a rollover-safe passage along the route $x_1$, $x_n$ ahead, in relation to the respective driving position x along the route $x_1$, $x_n$ ahead, on the basis of the curvature profile κ(x) of the route $x_1$, $x_n$ ahead and on the basis of the maximum admissible transverse acceleration $a_{y\ max\ ROP}$ according to the following calculation rule:

$$v_{max}(x) = \sqrt{\frac{a_{y\ maxROP}}{\kappa(x)}}$$

This step is symbolized by the "Calculation of limit speeds" box in FIG. 1 and by the "Maximal speed limit to not roll over" box in FIG. 2. Consequently, the assigned limit speed $v_{max}(x_1)$, $v_{max}(x_2)$, $v_{max}(x_n)$ for each distance $x_1$ to $x_n$ is calculated in this step. Consequently, the limit speeds $v_{max}(x_1)$, $v_{max}(x_2)$, ... $v_{max}(x_n)$ that ensure a rollover-safe passage of the route $x_1$, $x_n$ ahead are calculated. The curvatures κ(x) to be driven are known from the previously transmitted or provided information items about the route $x_1$, $x_n$ ahead or they were ascertained. The maximum admissible transverse acceleration $a_{y\ max\ ROP}$ was determined by analyzing the current driving situation and the current load of the tractor or the tractor-trailer combination. The admissible transverse acceleration $a_{y\ max\ ROP}$ describes the transverse acceleration at which the tractor or the tractor-trailer combination just does not roll over under the current driving situation (speed, longitudinal acceleration) and the current load. The ascertained admissable transverse acceleration $a_{y\ max\ ROP}$ may be related to the roadway information items (e.g. grade, lateral inclination) and the current activities of the vehicle driver. Then, the maximum limit speed $v_{max}(x)$ is calculated from the ascertained admissible transverse acceleration $a_{y\ max\ ROP}$ and the curvatures κ(x) to be driven.

In the next step, which is symbolized by the "Calculating the required longitudinal acceleration" box in FIG. 1 and by the "Needed deceleration to reach max speed limit" box in FIG. 2, longitudinal decelerations $a_{x\ need}(x)$ that are required to prevent rollover, in relation to the respective driving position or distance x along the route $x_1$, $x_n$ ahead, are calculated on the basis of the maximum limit speeds $v_{max}(x)$ and on the basis of the vehicle speed $v_{act}$ present at the current driving position $x_{act}$ of the vehicle or the tractor-trailer combination according to the following calculation rule:

$$a_{x\ need}(x) = \frac{v(x)_{max}^2 - v_{act}^2}{2 \cdot x}$$

Consequently, the longitudinal decelerations $a_{x\ need}(x)$ that are required to prevent rollover are length-wise decelerations. Consequently, the assigned longitudinal deceleration $a_{x\ need}(x_1)$ ... $a_{x\ need}(x_n)$ that is required to prevent rollover is calculated for each distance $x_1$ to $x_n$ from the current driving position $x_{act}$ in this step.

In the next step, which is not shown in the figures, a maximum required deceleration $a_{x\ max\ needed}$ is determined from the longitudinal decelerations $a_{x\ need}(x)$ that are required to prevent rollover, which are related to the respective driving position or distance x along the route ($x_1$, $x_n$) ahead:

$$a_{x\ max\ need} = \max(a_{x\ need}(x))$$

In the next step, there is a regulation, on the basis of the maximum required deceleration $a_{x\ max\ needed}$, of the actual speed of the vehicle or the tractor-trailer combination, depending on the driving position or distance x along the route $x_1$, $x_n$, to the maximum limit speed $v_{max}(x)$ that was calculated for the relevant driving position or distance x in such a way that there only is a regulation of the actual speed for the driving positions or distances x along the route $x_1$, $x_n$ at which there is a need for a longitudinal deceleration but no longitudinal acceleration. The background of this procedure is that no positive acceleration should be exerted on the tractor or the tractor-trailer combination without action by the vehicle driver; instead, all that should be carried out is a deceleration (negative acceleration) where necessary. Therefore, if the ascertained longitudinal acceleration is not a deceleration, it is not considered any further.

Furthermore, characteristics representing risk potentials at assigned driving positions x may be produced on the basis of the longitudinal decelerations $a_{x\ need}(x)$ in relation to the respective driving position or distance x along the route $x_1$, $x_n$ ahead.

In so doing, particularly if a limit characteristic that represents a certain limit risk potential is already exceeded by a characteristic before reaching the driving position x assigned to this characteristic, at least one of the following measures can be performed: outputting an acoustic and/or optical warning signal for the vehicle driver, activating collision protection devices, stiffening the suspension of the vehicle or the tractor-trailer combination, increasing the brake pressure in brake cylinders.

In FIG. 1, this step is symbolized by the "Evaluating the risk potential and regulating to a limit speed" block.

In order to implement the maximum required calculated deceleration on the tractor or the tractor-trailer combination, the necessary brake force $F_{brems}$ for the tractor or the tractor-trailer combination is calculated with the aid of the known vehicle mass:

$$F_{brems} = m_{Fzg} * a_{x\ max\ need}$$

The necessary brake force $F_{brems}$ may be related to information items about the roadway (e.g. grade, lateral inclination) and current activities of the vehicle driver.

If the required brake force $F_{brems}$ is not applied by external circumstances (e.g. grade of the roadway) or by reaction of the driver (e.g. actuation of the brake pedal), the necessary brake force $F_{brems}$ is realized within the scope of the method by, for example, actuating or activating the following vehicle devices:

continuous service brake system (retarder)
motor brake (motor torque)
braking interventions (overall and individual for each wheel) by service brake and/or parking brake The results of the calculation of the necessary longitudinal acceleration are used to evaluate the risk potential at the current time of the vehicle. Application parameters render it possible to set the required longitudinal acceleration at which the system should intervene. Thus, for example, the limit speed can be comfortably adjusted merely by an early reduction of the motor torque, or else it can be adjusted very late by a hard brake intervention. This provides the vehicle driver with the option of reacting independently. Any stage between the two aforementioned extremes is conceivable.

If an acute risk potential is assumed, the following measures can be introduced:

preparing the brake system and other systems and functions for braking (filling the brake cylinders, firming the chassis, activating collision preparation systems, activating driving dynamics stabilization functions)
acoustic/optical feedback to the driver

The invention claimed is:

1. A method for preventing a rollover of a vehicle or a tractor-trailer combination in curves, counteracting a rollover risk of the vehicle or the tractor-trailer combination by independent regulating interventions, carried out without action by a vehicle driver, in a regulation system that actuates a drive and/or brakes of the vehicle, the method comprising:
   a) capturing a current driving situation and a current load of the vehicle or the tractor-trailer combination in relation to a current driving position of the vehicle or the tractor-trailer combination;
   b) ascertaining a maximum admissible transverse acceleration at the current driving position, at which maximum admissible transverse acceleration the vehicle or the tractor-trailer combination just does not roll over, in relation to the current driving situation and the current load of the vehicle or the tractor-trailer combination;
   c) obtaining information items about a course of a route, proceeding from the current driving position of the vehicle or the tractor-trailer combination, comprising information items about a curvature profile of the route ahead;
   d) calculating maximum limit speeds that ensure a rollover-safe passage along the route ahead, in relation to a respective driving position along the route ahead, based on the curvature profile of the route ahead and based on the maximum admissible transverse acceleration according to a following calculation rule:

$$v_{max}(x) = \sqrt{\frac{a_{ymaxROP}}{\kappa(x)}},$$

wherein $a_{y\ max\ ROP}$ is the maximum admissible transverse acceleration, wherein $v_{max}(x)$ is a maximum limit speed for a distance $x_1$ to $x_n$, wherein $x_1$ to $x_n$ are distances along the route, and wherein $\kappa(x)$ is the curvature profile;
   e) calculating longitudinal decelerations that are required to prevent rollover, in relation to the respective driving position along the route ahead, based on the maximum limit speeds and based on a vehicle speed present at the current driving position of the vehicle or the tractor-trailer combination according to the following calculation rule:

$$a_{xneed}(x) = \frac{v(x)_{max}^2 - v_{act}^2}{2 \cdot x},$$

wherein $a_{x\ need}(x)$ is a longitudinal deceleration to prevent a rollover, wherein $v_{act}$ is an actual velocity or speed of the vehicle, and wherein x is a distance;
   f) determining a maximum required deceleration from the longitudinal decelerations that are required to prevent rollover, which are related to the respective driving position along the route ahead:

$$a_{x\ max\ need} = \max(a_{x\ need}(x)),$$

wherein $a_{x\ need}(x)$ is the longitudinal deceleration to prevent a rollover, and wherein $a_x$ max need is a maximum longitudinal deceleration; and
   g) regulating, based on the maximum required deceleration, an actual speed of the vehicle or the tractor-trailer combination, depending on a driving position along the route, to the maximum limit speed that was calculated for a relevant driving position so that there only is a regulation of the actual speed for driving positions along the route at which there is a need for the longitudinal deceleration but not the longitudinal acceleration;

wherein a radar camera and an evaluation device capture and determine the route ahead, represented by data points $x_1$ to $x_n$, wherein evaluation is done with a multi-order polynomial, and wherein based on data obtained about the route ahead, the curvature profile $\kappa(x)$ is ascertained in relation to a distance from a current driving position $x_{act}$ or in relation to a driving position $x_i$, so that an assigned curvature $\kappa(x_1)$, $\kappa(x_2) \ldots \kappa(x_n)$ is calculated for each distance $x_1$ to $x_n$ from the current driving position $x_{act}$ according to:

$$\kappa(x) = \frac{f''(x)}{(1+f'(x)^2)^{\frac{3}{2}}},$$

so that the course of the route ahead, represented by $x_1$ to $x_n$, contains the curvature profile $\kappa(x)$ of a roadway;
   wherein $x_{act}$ is the current driving position, wherein $x_1$ to $x_n$ is each distance from the current driving position $x_{act}$, wherein f'(x) and f''(x) are derivatives of f(x), and wherein $\kappa(x)$ is the curvature profile.

2. The method of claim 1, wherein a necessary brake force that is required to obtain the maximum required deceleration is calculated based on a mass of the vehicle or the tractor-trailer combination according to:

$$F_{brems} = m_{Fzg} * a_{x\ max\ need},$$

wherein $F_{brems}$ is a required brake force, wherein $m_{Fzg}$ is the mass of the vehicle or the tractor-trailer combination, and wherein $a_{x\ max\ need}$ is the maximum longitudinal deceleration.

3. The method of claim 2, wherein, when the necessary brake force is not able to be applied, or is not able to be applied completely, by an active actuation of a brake of the vehicle or the tractor-trailer combination by the vehicle driver and/or by forces that is able to be traced back to conditions of the route, the required brake force or the component of a brake force that is still missing in relation to the required brake force is produced by actuating, within a meaning of braking, at least one of following vehicle devices without action by the vehicle driver: a continuous service brake device, a motor, a service brake device, a parking brake device.

4. The method of claim 1, wherein capturing the current driving situation of the vehicle or the tractor-trailer combination includes at least one of: an ascertainment of a current speed and/or a current acceleration of the vehicle or the tractor-trailer combination in relation to the current driving position of the vehicle or the tractor-trailer combination.

5. The method of claim 1, wherein obtaining information items about the course of the route ahead, proceeding from the current driving position of the vehicle or the tractor-trailer combination, furthermore contains obtaining information items about a grade, an inclination and/or a coefficient of friction of the route ahead.

6. The method of claim 1, wherein obtaining information items about the course of the route ahead, proceeding from the current driving position of the vehicle or the tractor-trailer combination, is effectuated with onboard devices in relation to the vehicle or the tractor-trailer combination and/or with external data sources.

7. The method of claim 1, wherein characteristics representing risk potentials at assigned driving positions are produced based on the longitudinal decelerations in relation to the respective driving position along the route ahead.

8. The method of claim 7, wherein, if a limit characteristic that represents a certain limit risk potential is already exceeded by a characteristic before reaching the driving position assigned to this characteristic, at least one of the following measures is performed: outputting an acoustic and/or optical warning signal for the vehicle driver, activating collision protection devices, stiffening a suspension of the vehicle or the tractor-trailer combination, increasing a brake pressure in brake cylinders.

9. The method of claim 1, wherein active braking interventions by the vehicle driver are taken into account when determining conditions of the route.

10. The method of claim 1, wherein conditions of the route and/or active braking interventions by the vehicle driver are taken into account when determining required longitudinal decelerations.

11. The method of claim 1, wherein devices that serve to decelerate the vehicle or the tractor-trailer combination are tested in respect of availability of the devices.

12. The method of claim 1, wherein actuations or activations by the vehicle driver of at least one of: a retarder, a brake pedal, a driver assistance system, an accelerator pedal, and/or a differential lock are tested.

13. An apparatus for preventing a rollover of a vehicle or a tractor-trailer combination in curves, comprising:
at least one regulation system to actuate a drive and/or brakes of the vehicle, wherein the at least one regulation system counteracts a rollover risk of the vehicle or the tractor-trailer combination by independent regulating interventions, carried out without action by a vehicle driver;
wherein the at least one regulation system is configured to perform:
  a) capturing a current driving situation and a current load of the vehicle or the tractor-trailer combination in relation to a current driving position of the vehicle or the tractor-trailer combination;
  b) ascertaining a maximum admissible transverse acceleration at the current driving position, at which maximum admissible transverse acceleration the vehicle or the tractor-trailer combination just does not roll over, in relation to the current driving situation and the current load of the vehicle or the tractor-trailer combination;
  c) obtaining information items about a course of a route, proceeding from the current driving position of the vehicle or the tractor-trailer combination, comprising information items about a curvature profile of the route ahead;
  d) calculating maximum limit speeds that ensure a rollover-safe passage along the route ahead, in relation to a respective driving position along the route ahead, based on the curvature profile of the route ahead and based on the maximum admissible transverse acceleration according to the following calculation rule:

$$v_{max}(x) = \sqrt{\frac{a_{ymaxROP}}{\kappa(x)}},$$

wherein $a_{y\ max\ ROP}$ is the maximum admissible transverse acceleration, wherein $v_{max}(x)$ is a maximum limit speed for a distance $x_1$ to $x_n$, wherein $x_1$ to $x_n$ are distances along the route, and wherein $K(X)$ is the curvature profile;
  e) calculating longitudinal decelerations that are required to prevent rollover, in relation to the respective driving position along the route ahead, based on the maximum limit speeds and based on a vehicle speed present at the current driving position of the vehicle or the tractor-trailer combination according to the following calculation rule:

$$a_{xneed}(x) = \frac{v(x)_{max}^2 - v_{act}^2}{2 \cdot x},$$

wherein $a_{x\ need}(x)$ is a longitudinal deceleration to prevent a rollover, wherein $v_{act}$ is an actual velocity or speed of the vehicle, and wherein X is a distance;
  f) determining a maximum required deceleration from the longitudinal decelerations that are required to prevent rollover, which are related to the respective driving position along the route ahead:

$$a_{x\ max\ need} = \max(a_{x\ need}(x)),$$

wherein $a_{x\ need}(x)$ is the longitudinal deceleration to prevent a rollover, and wherein $a_{x\ max\ need}$ is a maximum longitudinal deceleration; and
  g) regulating, based on the maximum required deceleration, an actual speed of the vehicle or the tractor-trailer combination, depending on a driving position along the route, to the maximum limit speed that was calculated for a relevant driving position so that there only is a regulation of the actual speed for driving positions along the route at which there is a need for the longitudinal deceleration but not the longitudinal acceleration;
wherein a radar camera and an evaluation device capture and determine the route ahead, represented by data points $x_1$ to $x_n$, wherein evaluation is done with a multi-order polynomial, and wherein based on data obtained about the route ahead, the curvature profile $\kappa(x)$ is ascertained in relation to a distance from a current driving position $x_{act}$ or in relation to a driving position Xi, so that an assigned curvature $\kappa(x_1)$, $\kappa(x_2) \ldots \kappa(x_n)$ is calculated for each distance $x_1$ to $x_n$ from the current driving position $x_{act}$ according to the following:

$$\kappa(x) = \frac{f''(x)}{(1 + f'(x)^2)^{\frac{3}{2}}},$$

so that the course of the route ahead, represented by $x_1$ to $x_n$, contains the curvature profile $\kappa(x)$ of a roadway
wherein $x_{act}$ is the current driving position, wherein $x_1$ to $x_n$ is each distance from the current driving position $x_{act}$, wherein f'(x) and f''(x) are derivatives of f(x), and wherein $\kappa(x)$ is the curvature profile.

14. A vehicle, comprising:
an apparatus for preventing a rollover of a vehicle or a tractor-trailer combination in curves, including at least one regulation system to actuate a drive and/or brakes of the vehicle, wherein the at least one regulation system counteracts a rollover risk of the vehicle or the tractor-trailer combination by independent regulating interventions, carried out without action by a vehicle driver;

wherein the at least one regulation system is configured to perform:

a) capturing a current driving situation and a current load of the vehicle or the tractor-trailer combination in relation to a current driving position of the vehicle or the tractor-trailer combination;

b) ascertaining a maximum admissible transverse acceleration at the current driving position, at which maximum admissible transverse acceleration the vehicle or the tractor-trailer combination just does not roll over, in relation to the current driving situation and the current load of the vehicle or the tractor-trailer combination;

c) obtaining information items about a course of a route, proceeding from the current driving position of the vehicle or the tractor-trailer combination, comprising information items about a curvature profile of the route ahead;

d) calculating maximum limit speeds that ensure a rollover-safe passage along the route ahead, in relation to a respective driving position along the route ahead, based on the curvature profile of the route ahead and based on the maximum admissible transverse acceleration according to the following calculation rule:

$$v_{max}(x) = \sqrt{\frac{a_{ymaxROP}}{\kappa(x)}},$$

wherein $a_{y\ max\ ROP}$ is the maximum admissible transverse acceleration, wherein $v_{max}(x)$ is a maximum limit speed for a distance $x_1$ to $x_n$, wherein $x_1$ to $x_n$ are distances along the route, and wherein $\kappa(x)$ is the curvature profile;

e) calculating longitudinal decelerations that are required to prevent rollover, in relation to the respective driving position along the route ahead, based on the maximum limit speeds and based on the vehicle speed present at a current driving position of the vehicle or the tractor-trailer combination according to the following calculation rule:

$$a_{xneed}(x) = \frac{v(x)_{max}^2 - v_{act}^2}{2 \cdot x},$$

wherein $a_{x\ need}(x)$ is a longitudinal deceleration to prevent a rollover, wherein $v_{act}$ is an actual velocity or speed of the vehicle, and wherein x is a distance;

f) determining a maximum required deceleration from the longitudinal decelerations that are required to prevent rollover, which are related to the respective driving position along the route ahead:

$$a_{x\ max\ need} = \max(a_{x\ need}(x)),$$

wherein $a_{x\ need}(x)$ is the longitudinal deceleration to prevent a rollover, and wherein $a_{x\ max\ need}$ is a maximum longitudinal deceleration; and g) regulating, based on the maximum required deceleration, an actual speed of the vehicle or the tractor-trailer combination, depending on a driving position along the route, to the maximum limit speed that was calculated for a relevant driving position so that there only is a regulation of the actual speed for driving positions along the route at which there is a need for the longitudinal deceleration but not the longitudinal acceleration;

wherein a radar camera and an evaluation device capture and determine the route ahead, represented by data points $x_1$ to $x_n$, wherein evaluation is done with a multi-order polynomial, and wherein based on data obtained about the route ahead, the curvature profile $\kappa(x)$ is ascertained in relation to a distance from a current driving position $x_{act}$ or in relation to a driving position $x_i$, so that an assigned curvature $\kappa(x_1)$, $\kappa(x_2) \ldots \kappa(x_n)$ is calculated for each distance $x_1$ to $x_n$ from the current driving position $x_{act}$ according to the following:

$$\kappa(x) = \frac{f''(x)}{(1 + f'(x)^2)^{\frac{3}{2}}},$$

so that the course of the route ahead, represented by $x_1$ to $x_n$, contains the curvature profile $\kappa(x)$ of a roadway wherein $x_{act}$ is the current driving position, wherein $x_1$ to $x_n$ is each distance from the current driving position $x_{act}$, wherein f'(x) and f''(x) are derivatives of f(x), and wherein $\kappa(x)$ is the curvature profile.

* * * * *